United States Patent [19]
Ganzel

[11] Patent Number: 5,630,623
[45] Date of Patent: May 20, 1997

[54] VEHICLE ROLL CONTROL SYSTEM

[75] Inventor: Blaise J. Ganzel, Ann Arbor, Mich.

[73] Assignee: Kelsey Hayes, Ann Arbor, Mich.

[21] Appl. No.: 627,384

[22] Filed: Apr. 4, 1996

Related U.S. Application Data

[63] Continuation of Ser. No. 290,692, Aug. 15, 1994, abandoned.

[51] Int. Cl.$^6$ .................................................. B60G 11/26
[52] U.S. Cl. ...................................... 280/772; 280/707
[58] Field of Search .................................... 280/704, 707, 280/714, 772, 773; 188/299; 207/64.28

[56] References Cited

U.S. PATENT DOCUMENTS

| | | |
|---|---|---|
| 3,752,497 | 8/1973 | Enke et al. . |
| 3,820,812 | 6/1974 | Stubbs et al. . |
| 3,868,910 | 3/1975 | Schultz . |
| 3,868,911 | 3/1975 | Schultz . |
| 3,871,635 | 3/1975 | Unruh et al. . |
| 3,885,809 | 5/1975 | Pitcher . |
| 3,953,040 | 4/1976 | Unruh et al. . |
| 4,206,935 | 6/1980 | Sheppard et al. . |
| 4,345,661 | 8/1982 | Nishikawa . |
| 4,589,678 | 5/1986 | Lund . |
| 4,624,476 | 11/1986 | Tanaka et al. . |
| 4,669,749 | 6/1987 | Tanaka et al. . |
| 4,693,493 | 9/1987 | Ikemoto et al. . |
| 4,697,237 | 9/1987 | Tanaka et al. . |
| 4,730,843 | 3/1988 | Tanaka et al. . |
| 4,765,649 | 8/1988 | Ikemto et al. . |
| 4,903,982 | 2/1990 | Harara et al. . |
| 4,937,748 | 6/1990 | Yonekawa et al. . |
| 4,966,390 | 10/1990 | Lund et al. . |
| 4,974,875 | 12/1990 | Sugasawa et al. ............... 280/772 |
| 5,020,826 | 6/1991 | Stecklein et al. . |
| 5,040,823 | 8/1991 | Lund . |
| 5,066,041 | 11/1991 | Kindermann et al. ............ 280/772 |
| 5,106,120 | 4/1992 | Di Maria . |
| 5,149,131 | 9/1992 | Sugasawa et al. ............... 280/772 |
| 5,161,822 | 11/1992 | Lund ............................... 280/772 |
| 5,177,681 | 1/1993 | Sato . |
| 5,178,406 | 1/1993 | Reynolds . |
| 5,219,181 | 6/1993 | Lund . |
| 5,230,529 | 7/1993 | Harvey-Bailey . |
| 5,251,134 | 10/1993 | Takehara et al. . |
| 5,251,136 | 10/1993 | Fukuyama et al. . |
| 5,253,174 | 10/1993 | Inagaki et al. . |
| 5,362,094 | 11/1994 | Jensen ............................ 280/772 |

OTHER PUBLICATIONS

"Sachs ADC and ARS Systems," Vehicle News No. 198 (Oct. 1992).

"On-Road/Off-Road: Isuzu's Switchable Stabilizer," Automobile Magazine (Mar. 1994).

*Primary Examiner*—Matthew C. Graham
*Attorney, Agent, or Firm*—Brooks & Kushman P.C.

[57] ABSTRACT

A passive system is disclosed for controlling the roll of a motor vehicle. The system comprises an actuator connected between an unsprung portion of the vehicle and a sprung portion of the vehicle, first and second pressure control valves, and first and second check valves. The first pressure control valve is in communication with a first port of the actuator and has a first position where flow away from the first port is prevented up to a predetermined pressure. The first check valve is in parallel with the first pressure control valve. The second pressure control valve is in communication with a second port of the actuator and has a first position where flow away from the second port is prevented up to a predetermined pressure. The second check valve is in parallel with the second pressure control valve.

10 Claims, 2 Drawing Sheets

VEHICLE ROLL CONTROL SYSTEM

CROSS REFERENCE TO RELATED APPLICATION

This application is a continuation of application Ser. No. 08/290,692 filed on Aug. 15, 1994 entitled "VEHICLE ROLL CONTROL SYSTEM", now abandoned.

TECHNICAL FIELD

This invention relates to motor vehicle roll control systems.

BACKGROUND ART

Suspension systems for motor vehicles are known which isolate the vehicle load from irregularities in the terrain over which the vehicle travels. A semi-active suspension system, for example, normally includes a spring and a damper connected between the sprung and unsprung portions of the vehicle. Semi-active suspension systems are generally self-contained, and only react to the loads applied to them. In active suspension systems, by contrast, the reactions to the applied loads are positively supplied by electronically controlled hydraulic or pneumatic actuators.

In addition to isolating the sprung portion of the vehicle from the road, it is desirable to stabilize the tendency of the sprung portion of the vehicle to tilt or roll relative to its unsprung portion when accelerating, decelerating or cornering at relatively high rates. Therefore, suspension systems have been proposed that attempt to maintain the vehicle in an essentially level position, regardless of the source of the force seeking to upset that position. For example, U.S. Pat. No. 4,206,935 to Sheppard et al. discloses a motor vehicle roll control system which includes anti-roll force adjustment means whereby the action of anti-roll bars can be modified within predetermined limits.

SUMMARY OF THE INVENTION

The present invention is a semi-active system for controlling the roll of a motor vehicle. The system comprises an actuator connected between an unsprung portion of the vehicle and a sprung portion of the vehicle, first and second pressure control valves, and first and second check valves. The first pressure control valve is in communication with a first port of the actuator and has a first position where flow away from the first port is prevented up to a predetermined pressure. The first check valve is in parallel with the first pressure control valve. The second pressure control valve is in communication with a second port of the actuator and has a first position where flow away from the second port is prevented up to a predetermined pressure. The second check valve is in parallel with the second pressure control valve.

Accordingly, it is an object of the present invention to provide a semi-active roll control system of the type described above which allows the vehicle suspension members to ratchet back to their original positions when an unexpected load is inclosed on them when the roll control system is functioning.

Another object of the present invention is to provide a roll control system of the type described above which has separate front and rear hydraulic circuits to eliminate the need for expensive flexible hydraulic hoses.

These and other objects, features, and advantages of the present invention are readily apparent from the following detailed description of the best mode for carrying out the invention when taken in conjunction with the accompanying drawings.

BEST MODE FOR CARRYING OUT THE INVENTION

Figure 1:
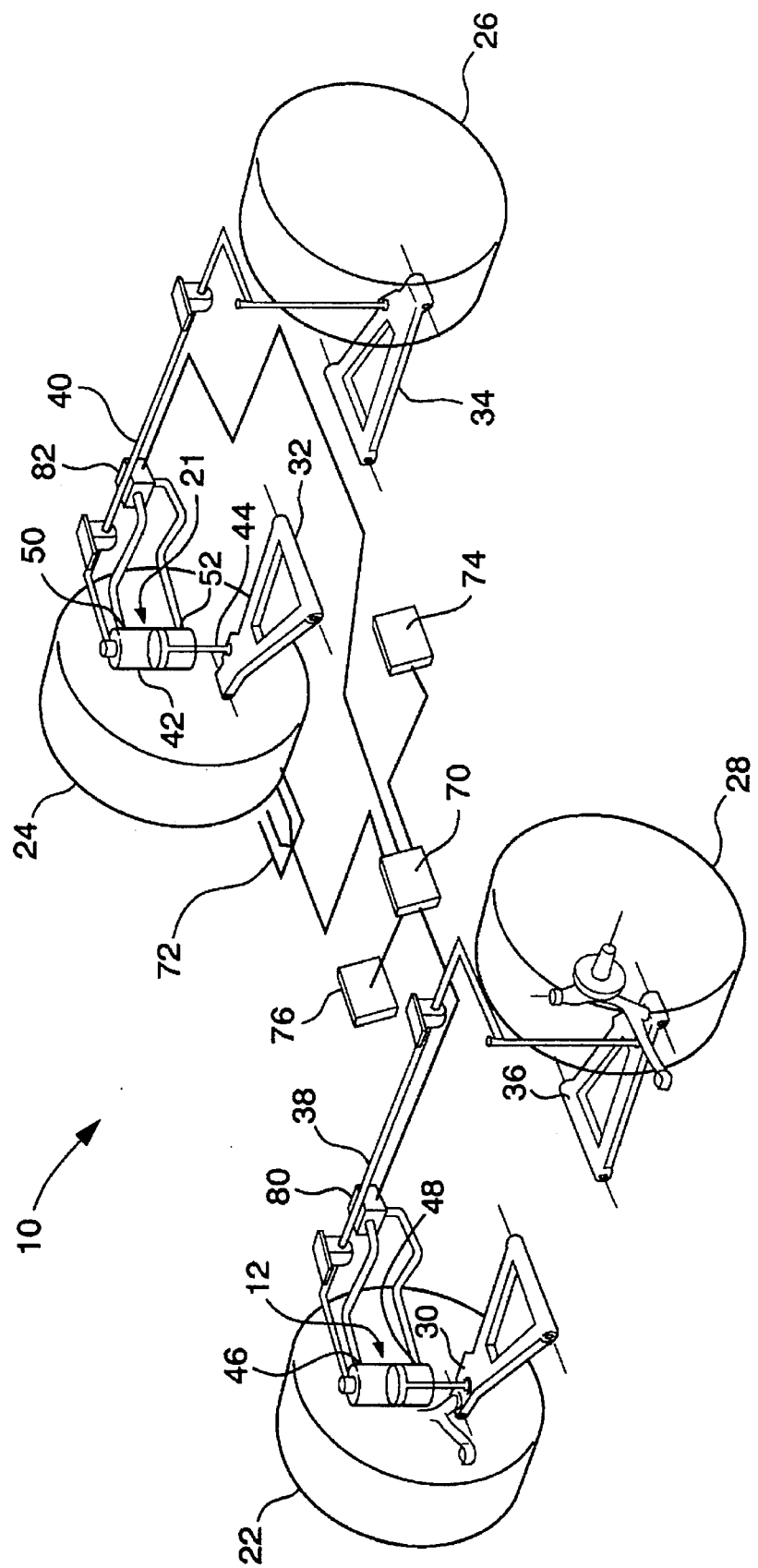
FIG. 1 is a schematic view of a system according to the present invention for controlling the roll of a motor vehicle.
Figure 2:
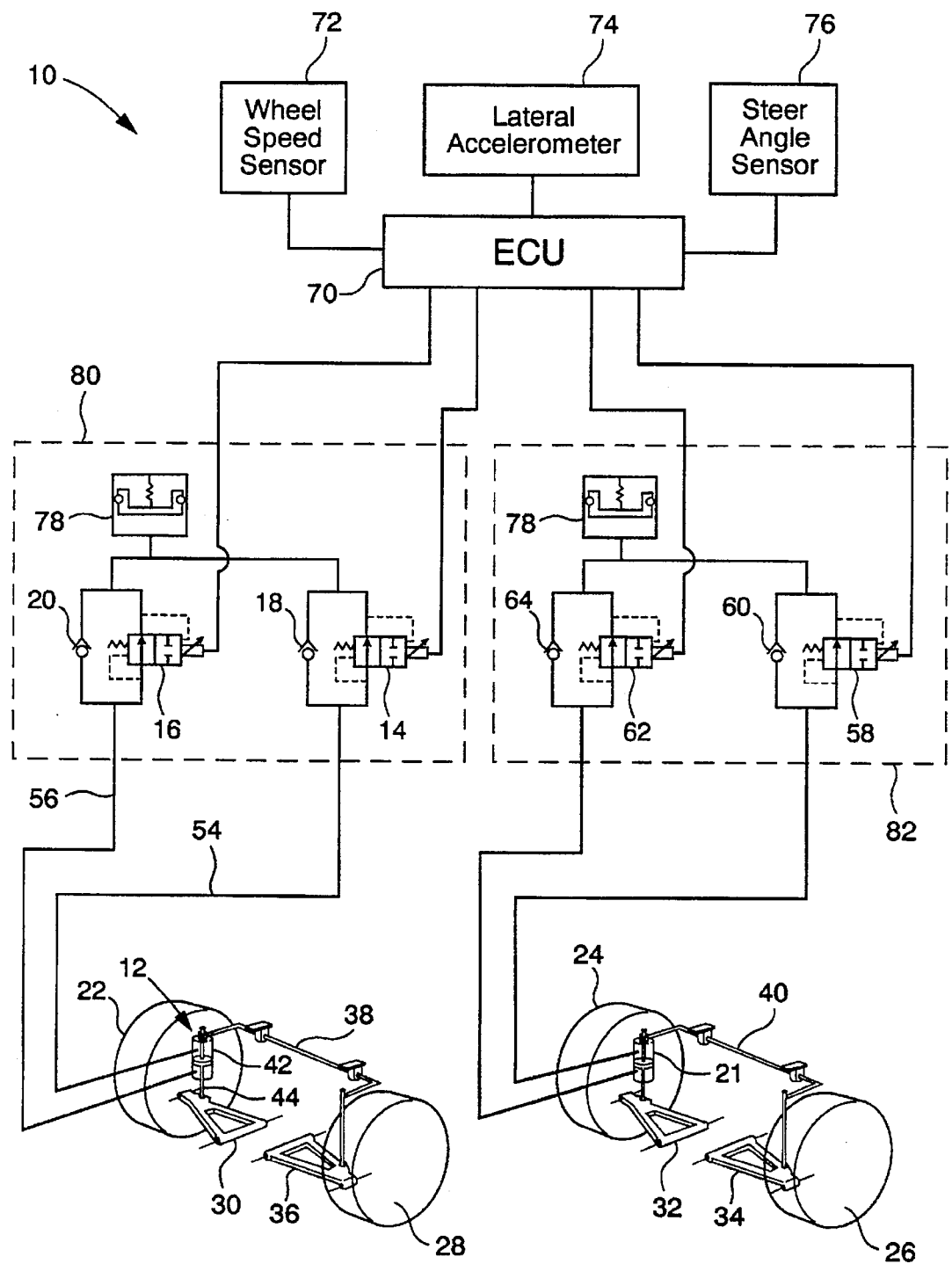
FIG. 2 is another schematic view of the roll control system shown in FIG. 1.

With reference to the drawings, the preferred embodiments of the present invention will be described. FIGS. 1 and 2 show a semi-active, pumpless system 10 according to the present invention for controlling the roll of a motor vehicle. The system 10 comprises an actuator 12, first and second pressure control or pressure relief valves 14 and 16, and first and second check valves 18 and 20. In the embodiment shown in FIGS. 1 and 2, a second, rear actuator 21 and corresponding hydraulic circuit are also provided.

Each of the wheels 22, 24, 26 and 28 of the vehicle is rotationally mounted about a substantially horizontal axis to a member such as suspension arms 30, 32, 34 and 36, respectively, which form part of an unsprung portion of the vehicle. The unsprung portion of the vehicle is in turn connected to a sprung portion of the vehicle through the actuators 12 and 21 and anti-roll or anti-sway bars 38 and 40. Each of the actuators 12 and 21 includes a cylinder 42 and a piston 44 reciprocably disposed in the cylinder.

One of the cylinder 42 or piston 44 of each actuator is drivingly connected to one of the anti-roll bar or suspension arm, while the other of the cylinder/piston pair is drivingly connected to the other of the anti-roll bar or suspension arm. In the embodiment shown in FIGS. 1 and 2, for example, the cylinder 42 of the front actuator 12 is connected to one free end of the front anti-roll bar 38, while the portion of the piston rod extending generally downwardly from the cylinder is connected to the front right suspension arm 30. Similarly, the rear anti-roll bar 40 is coupled to the cylinder 42 of the right rear actuator 21 while the piston 44 of the actuator 21 is connected to the suspension arm 32.

The actuators 12 and 21 each have a pair of ports, respectively 46, 48 and 50, 52, through which a working medium such as hydraulic fluid may be alternately provided to or evacuated from the ends of the cylinders 42 disposed on either side of the pistons 44 situated therein. As described more fully below, each of the actuators 12 and 21 serves to maintain the sprung height from the road surface of the portion of the vehicle body above its associated wheel. Although the embodiment of the present invention shown in FIGS. 1 and 2 depicts linear actuators in the form of hydraulic cylinders, it should be appreciated that the actuators may alternatively comprise rotary actuators such as those disclosed in application Ser. No. 08/290,581 assigned to the assignee of the present invention and hereby incorporated by reference.

The first pressure control valve 14 is preferably a proportional relief valve, and is in communication with the first port 46 of the actuator 12 through a hydraulic line 54. The valve 14 is operated by a proportional solenoid, and has an open position and a closed position. In response to actual or anticipated loading of the actuator 12, the solenoid energizes the valve 14 toward the closed position with a force proportional to an electric signal applied thereto, which prevents flow away from the first port 46 until a predetermined pressure develops in the upper chamber of the cylinder 42 to overcome the solenoid force, as described more fully below.

The first check valve 18 is situated in the hydraulic circuit in parallel with the first pressure control valve 14, and permits flow therethrough only in a direction toward the first port 46 of the actuator 12.

The second pressure control valve 16 is also preferably a proportional relief valve, and is in communication with the second port 48 of the actuator 12 through a hydraulic line 56. The valve 16 is also controlled by a proportional solenoid, and can be moved between open and closed positions by the solenoid to prevent flow away from the second port 48 until a predetermined pressure develops in the lower chamber of the cylinder 42. The second check valve 20 is situated in the hydraulic circuit in parallel with the second pressure control valve 16 and, like the check valve 18, permits flow therethrough only toward the second port 48 of the actuator 12.

A hydraulic circuit for the rear actuator 21 is also provided and is substantially identical to the hydraulic circuit for the front actuator 12. Thus, a proportional pressure control valve 58 and a parallel check valve 60 are provided in communication with the first port 50 of the rear actuator 21, and another proportional pressure control valve 62 and a parallel check valve 64 are provided in communication with the second port 52 of the rear actuator.

In operation, an electronic control unit (ECU) 70 processes inputs from one or more wheel speed sensors 72, a lateral accelerometer 74, and a steering angle sensor 76. Given these inputs, the ECU predicts the severity of an upcoming roll, and issues control commands to the solenoids of the appropriate valves 14 and 58 or 16 and 62. For example, the motor vehicle may begin a relatively high speed left hand turn, which in absence of compensation by the system 10 would cause the unsprung portion of the vehicle to tend to roll generally clockwise about it longitudinal axis.

At the beginning of such a manuever, sensors 72, 74 and 76 of the present invention signal the instantaeous conditions to the ECU 70. The ECU in turn calculates or obtains from a look up table the net pressure P that needs to be developed in the upper chambers of the cylinders 42 of one or both of the actuators 12 and 21 to counteract the vehicle roll, and energizes the solenoids of the pressure control valves 14 and 58 an amount sufficient to resist flow through those valves up to the pressure P.

To counteract anticipated vehicle roll in the opposite direction, for example as might he experienced during a right hand turn, the ECU 70 repeats this procedure and energizes the solenoids of the valves 16 and 62 to allow build up of the pressure in the lower chambers of both actuator 12 and 21. In either case, as the sensors 72, 74 and 76 indicate an instantaneous or anticipated reduction or increase in the need for counteracting vehicle roll, the ECU signals the appropriate pressure control valves to correspondingly reduce or increase their pressure cut out limit.

If an unexpected load is imposed on one of the actuators, such as might occur when one wheel rolls over a bump in the road, an increased pressure is developed in one chamber of the affected actuator. For example, if the right front wheel 22 encounters a bump and deflects upwardly during a left hand turn, the piston 44 is dispaced upwardly in the cylinder 42 and the pressure in the upper chamber of the actuator 12 increases. Even if the valve 14 is closed at this time, the increased pressure overcomes the solenoid force, allowing the suspension to compress and maintain ride quality. As the wheel 22 then passes over the top of the bump and the valve 14 closes again, the check valve 18 allows the piston 44 and the suspension arm 30 to fall back down near their original positions without any resistance from the roll control system. This process takes a finite amount of time, during which the vehicle body will likely roll to some extent, and therefore the piston 44 and the suspension arm 30 are unlikely to return entirely to their original positions.

In the event that the inside wheel 28 suddenly rises while the valve 14 is energized, the suspension arm 36 and the anti-roll bar 38 translate this force and extends the cylinder 42, reducing the pressure in the upper chamber of the actuator 12. If this pressure drops below the pressure in pre-charged accumulator 78, the check valve 18 allows flow into the upper chamber of the actuator 12 so that the anti-roll bar 38 may ratchet to a new position without resistance from the roll control system. It is advantageous in this system to employ a relatively stiff anti-roll bar to facilitate this process.

Thus, the roll control system of the present invention accomplishes more than simply locking or unlocking the anti-roll bar. It should also be apparent from this description to one of ordinary skill that the present invention accomodates upward or downward deflections of any of the four wheels of the vehicle, regardless of whether the affected wheel is on the inside or outside of the turn.

The accumulator 78 is situated in each of the front and rear hydraulic circuits in communication with the pressure control valves 14, 16 and 58, 62. By maintaining the fluid in the hydraulic circuits under a certain pressure, the accumulator 78 functions to prevent cavitation in the system 10 when the wheels of the vehicle deflect, and also acts as a reservoir to replenish any fluid lost by the system to leakage past dynamic seals. Preferably, all of the valves and the accumulator for each of the front and rear hydraulic circuits are packaged in units 80 and 82 mounted near the anti-roll bars 38 and 40. It should be appreciated that the front and rear hydraulic circuits are kept separate so that the valves of each circuit can ride with their respective anti-roll bar, which eliminates the need for running expensive flexible hydraulic hoses from the body of the vehicle to the bar.

To simplify the control logic of the system 10, it should be appreciated that the actuators 12 and 21 may be pressure balanced with a double ended piston disposed in each, and/or the valves 14, 16, 58 and 62 may be high pressure differential valves designed in accordance with the disclosure in application Ser. No. 08/290,581.

It should be understood that while the forms of the invention shown and described above constitute preferred embodiments of the invention, they are not intended to illustrate all possible forms thereof. It should also be understood that the words used are words of description rather than limitation, and various changes may be made without departing from the spirit and scope of the invention disclosed.

I claim:

1. A semi-active system for controlling the roll of a motor vehicle, the system comprising:

an accumulator;

an actuator connected between an unsprung portion of the vehicle and a sprung portion of the vehicle, the actuator having first and second ports;

a first check valve in communication with the accumulator and the first port of the actuator preventing flow from the first port to the accumulator;

a second check valve in communication with the accumulator and the second port of the actuator preventing flow from the second port to the accumulator;

a first pressure control valve in parallel with the first check valve and having a first position where flow from the first port to the accumulator is prevented up to a predetermined pressure so that the first pressure control valve and the first check valve completely isolate the first port from the accumulator at a pressure less than the predetermined pressure; and a second pressure control valve in parallel with the second check valve and having a first position where flow from the second port to the accumulator is prevented up to a predetermined pressure so that the second pressure control valve and the second check valve completely isolate the second port from the accumulator at a pressure less than the predetermined pressure.

2. The system of claim 1 wherein the actuator comprises a hydraulic cylinder.

3. The system of claim 1 wherein the actuator is connected between the unsprung portion of the vehicle and an anti-roll bar.

4. The system of claim 1 wherein the first and second pressure control valves each comprise a solenoid.

5. The system of claim 4 wherein the solenoids energize the first and second pressure control valves toward the first positions with a force proportional to an electric signal applied thereto.

6. The system of claim 1 further comprising:

a second actuator connected between the unsprung portion of the vehicle and the sprung portion of the vehicle, the second actuator having first and second ports;

a third pressure control valve in communication with the first port of the second actuator and having a first position where flow away from the first port of the second actuator is prevented up to a predetermined pressure;

a third check valve in parallel with the third pressure control valve;

a fourth pressure control valve in communication with the second port of the second actuator and having a first position where flow away from the second port of the second actuator is prevented up to a predetermined presure; and a fourth check valve in parallel with the fourth pressure control valve.

7. A system for controlling the roll of a motor vehicle, the system comprising:

an anti-roll bar;

an actuator connected between the anti-roll bar and an unsprung portion of the vehicle, the actuator having first and second ports;

an accumulator;

a first check valve in communication with the accumulator and the first port of the actuator preventing flow from the first port to the accumulator;

a second check valve in communication with the accumulator and the second port of the actuator preventing flow from the second port to the accumulator;

a first pressure control valve in parallel with the first check valve and having a first position where flow from the first port to the accumulator is prevented up to a predetermined pressure so that the first pressure control valve and the first check valve completely isolate the first port from the accumulator at a pressure less than the predetermined pressure; and a second pressure control valve in parallel with the second check valve and having a first position where flow from the second port to the accumulator is prevented up to a predetermined pressure so that the second pressure control valve and the second check valve completely isolate the second port from the accumulator at a pressure less than the predetermined pressure.

8. The system of claim 7 wherein the actuator comprises a hydraulic cylinder.

9. The system of claim 7 wherein the first and second pressure control valves each comprise a solenoid.

10. The system of claim 9 wherein the solenoids energize the first and second pressure control valves toward the first positions with a force proportional to an electric signal applied thereto.

* * * * *